United States Patent
Wang et al.

(10) Patent No.: US 11,179,925 B2
(45) Date of Patent: Nov. 23, 2021

(54) FIXTURE FOR BONDING PURPOSES AND METHOD FOR BONDING USING THE FIXTURE

(71) Applicants: Interface Technology Co., Ltd., Chengdu (CN); INTERFACE OPTOELECTRONICS CO., LTD., Shenzhen (CN); GENERAL INTERFACE SOLUTION LIMITED, Zhunan (TW)

(72) Inventors: Po-Sen Wang, Zhunan (TW); Yi-Fan Chang, Zhunan (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Hsinchu (TW)

(*) Notice: Subject to any disclaimer, the term of this patent is extended or adjusted under 35 U.S.C. 154(b) by 308 days.

(21) Appl. No.: 16/299,978

(22) Filed: Mar. 12, 2019

(65) Prior Publication Data
US 2020/0198315 A1    Jun. 25, 2020

(30) Foreign Application Priority Data
Dec. 25, 2018   (CN) .......................... 201811588435.7

(51) Int. Cl.
*B32B 37/10*    (2006.01)
*B32B 27/08*    (2006.01)
*B29C 63/00*    (2006.01)
*B61G 5/00*     (2006.01)

(52) U.S. Cl.
CPC .......... *B32B 37/10* (2013.01); *B29C 63/0004* (2013.01); *B29C 63/0065* (2013.01); *B32B 27/08* (2013.01); *B61G 5/00* (2013.01); *Y10T 29/53961* (2015.01)

(58) Field of Classification Search
CPC ........... B32B 37/10; B32B 27/08; B32B 1/00; B32B 9/04; B32B 9/005; B32B 27/06; B32B 2250/02; B29C 63/0065; B29C 63/0004; B29C 63/02; Y10T 29/53961
See application file for complete search history.

(56) References Cited

U.S. PATENT DOCUMENTS 6,665,907 B1 * 12/2003 Lu .......................... E05D 11/087
                                                            16/337
8,926,247 B2 *  1/2015 Schaser .................... F16F 3/12
                                                            411/371.1

FOREIGN PATENT DOCUMENTS

CN         106585045 A  *  4/2017

* cited by examiner

*Primary Examiner* — Ryan J. Walters
(74) *Attorney, Agent, or Firm* — ScienBiziP, P.C.

(57) ABSTRACT

A fixture for bonding films to an object includes a base, a cavity wall fixed to the base, and a receiving cavity defined by the cavity wall and the base. The cavity wall includes opposing inner and outer surfaces and an end surface at an end away from the base. The end surface defines protrusions interconnecting with recesses and being recessed towards the base. Each recess penetrates the inner surface and the outer surface. A method for employing the device is also provided. The fixture and the method for bonding avoid center wrapping after bonding.

2 Claims, 9 Drawing Sheets

```
┌─────────────────────────────────────────────┐
│ providing a hot press bonding device, a     │
│ film, a workpiece, and a fixture, the hot   │
│ press bonding device comprising a first     │
│ chamber and a second chamber, the film      │
│ being to be bound to a surface of the       │
│ workpiece, and the fixture including a base,│
│ a cavity wall fixed to the base, a receiving│
│ cavity defined by the cavity wall and the   │
│ base, the cavity wall including an inner    │──S1
│ surface, an outer surface opposite to the   │
│ inner surface, and an end surface at an     │
│ end away from the base, the end surface     │
│ defining a plurality of protrusions and a   │
│ plurality of recesses connecting the        │
│ protrusions and being recessed towards the  │
│ base, and each of the plurality of recesses │
│ penetrating the inner surface and the outer │
│ surface                                     │
└─────────────────────────────────────────────┘
                     ↓
┌─────────────────────────────────────────────┐
│ placing the workpiece in the receiving cavity,│
│ placing the fixture in a second cavity defined│
│ by the second chamber, facing the surface   │──S2
│ of the workpiece to be bonded to the first  │
│ chamber, and then closing the first chamber │
│ and the second chamber to fix the film      │
└─────────────────────────────────────────────┘
                     ↓
┌─────────────────────────────────────────────┐
│ applying a preset temperature and a preset  │
│ pressure to the film to let the film first  │
│ come into contact with the plurality of     │──S3
│ protrusions, followed by with the plurality of│
│ recesses, and then is bonded to the surface │
│ of the workpiece                            │
└─────────────────────────────────────────────┘
```

FIG. 3

FIXTURE FOR BONDING PURPOSES AND METHOD FOR BONDING USING THE FIXTURE

FIELD

The subject matter herein generally relates to bonding and methods for bonding.

BACKGROUND

In a hot press forming technology, an upper surface of a fixture on which a workpiece to be attached is horizontal. During the process of bonding the workpiece and a film, edges of the film are first attached to the upper surface of the fixture, and then the central area of the film is adhered to the workpiece. The bonding process described above may cause the center area of the film being wrapped after bonding.

Therefore, there is room for improvement in the art.

BRIEF DESCRIPTION OF THE DRAWINGS

Implementations of the present disclosure will now be described, by way of embodiment, with reference to the attached figures.

FIG. 3 is a flow chart of a bonding method according to an embodiment.

DETAILED DESCRIPTION

Figure 1:
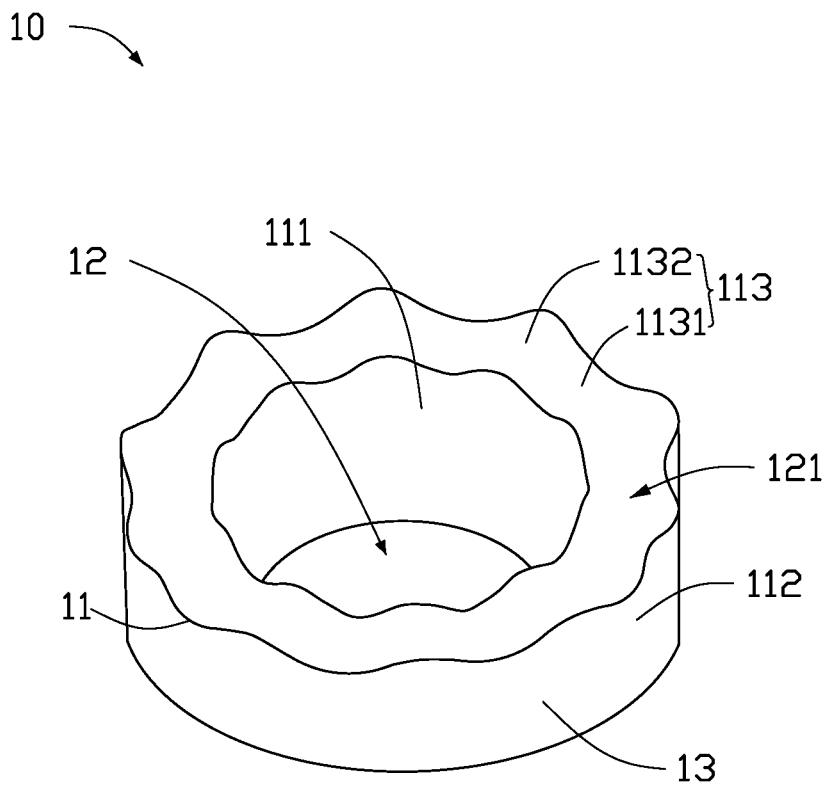
FIG. 1 is a structural view of a fixture for bonding purposes according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one".

Figure 2:
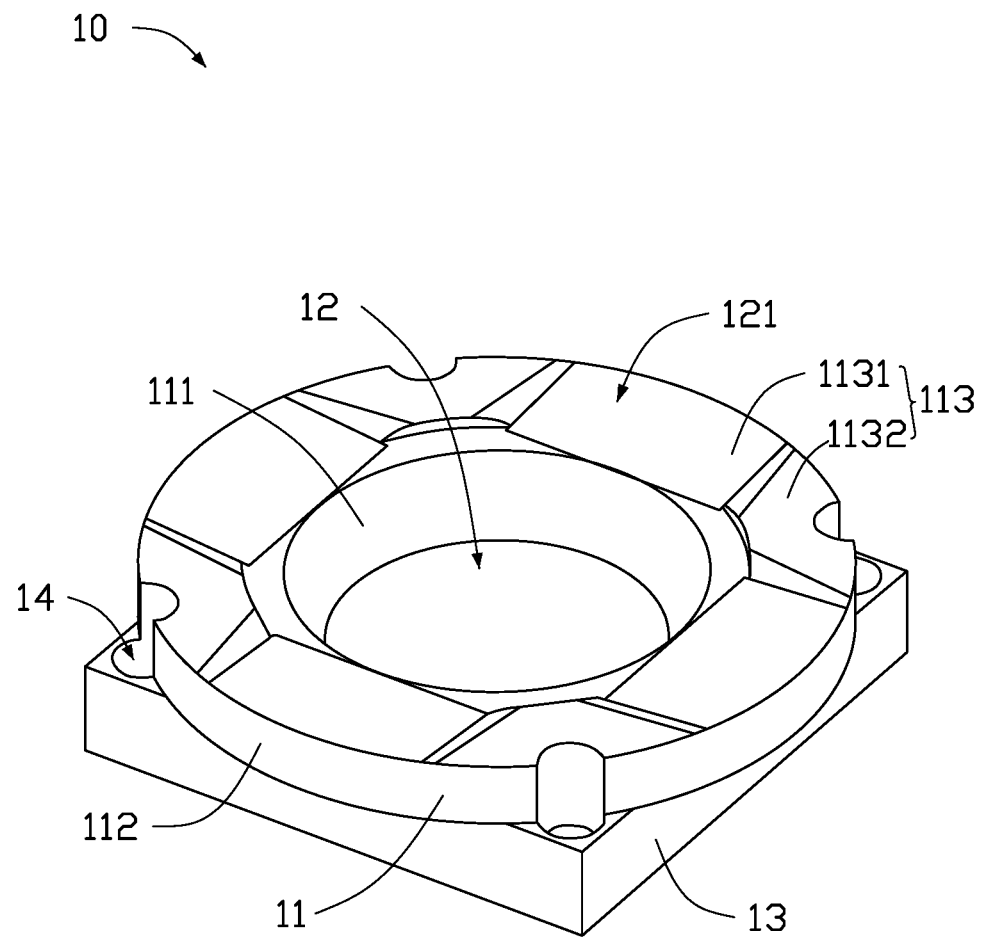
FIG. 2 is a structural view of the fixture according to another embodiment.

Referring to FIGS. 1 and 2, a fixture 10 for bonding according to an embodiment of the present disclosure includes a base 13, a cavity wall 11 fixed to the base 13, and a receiving cavity 12 defined by the cavity wall 11 and the base 13. The cavity wall 11 includes an inner surface 111, an outer surface 112 opposite to the inner surface 111, and an end surface 113 at an end away from the base 13. The end surface 113 connects to each of the inner surface 111 and the outer surface 112. The end surface 113 defines a plurality of protrusions 1132 and a plurality of recesses 1131 connecting the protrusions 1132. Each of the recesses 1131 is recessed towards the base 13 relative to the protrusions 1132. Each of the recesses 1131 extends from the inner surface 111 to the outer surface 112 of the cavity wall 11. The receiving cavity 12 is configured to receive a workpiece, such as a film. In one embodiment, the cavity wall 11 has a shape of a sleeve. An end of the receiving cavity 12 is covered by the base 13, and an opposite end of the receiving cavity 12 away from the base 13 defines an open end 121, and the workpiece can be inserted into the receiving cavity 12 from the open end 121. In one embodiment, a shape and a size of the receiving cavity 12 are correspondingly designed to match a shape and a size of the workpiece.

In one embodiment, the end face 113 is axisymmetric such that when the fixture 10 is in used, a stretching amount of the film can be made symmetrical. In another embodiment, the end surface 113 may be non-axisymmetric.

In one embodiment, a maximum height difference between the recesses 1131 and the protrusions 1132 is from 1 mm to 5 mm. In other words, a maximum depth of the recesses 1131 from the protrusions 1132 toward the base 13 is from 1 mm to 5 mm. As such, when the fixture 10 is being used, the amount of stretching of the film is limited. In an embodiment, there are at least three recesses 1131 and at least three protrusions 1132. That is, a total number of the recesses 1131 and the protrusions 1132 is not less than 6. In one embodiment, as shown in FIG. 1, each of the recesses 1131 and each of the protrusions 1132 defines a curved surface. One protrusion 1132 alternates with one recess 1131 to form a wave-like surface on the end surface 113.

In another embodiment, as shown in FIG. 2, each of the recesses 1131 and each of the protrusions 1132 defines a planar surface. The planar surface defined by each of the recess 1131 is inclined relative to the base 13 along a direction from the outer surface 112 toward the inner surface 111 such that a depth of each recess 1131 recessed toward the base 13 is gradually increased. That is, portions of the recesses 1131 which are closer to the receiving cavity 12 are deeper recessed toward the base 13 than portions of the recesses 1131 which are away from the receiving cavity 12

(as shown in FIGS. 4 through 7). When the fixture 10 is in use, the film can be smoothly attached to the recesses 1131.

As shown in FIG. 2, the fixture 10 further includes a plurality of mounting holes 14 in one embodiment. Each mounting hole 14 extends through the base 13 and the cavity wall 11. When the fixture 10 is in use, the fixture 10 can be fixed to a cavity of a hot press bonding device through the mounting holes 14 with mounting members (not shown) such as bolts or the like. In another embodiment, mounting members such as bolts or the like may be used to fix the fixture 10 to a platform (not shown) through the mounting holes 14, and then the platform and the fixture 10 can be placed together in the hot pressing bonding device.

Figure 4:
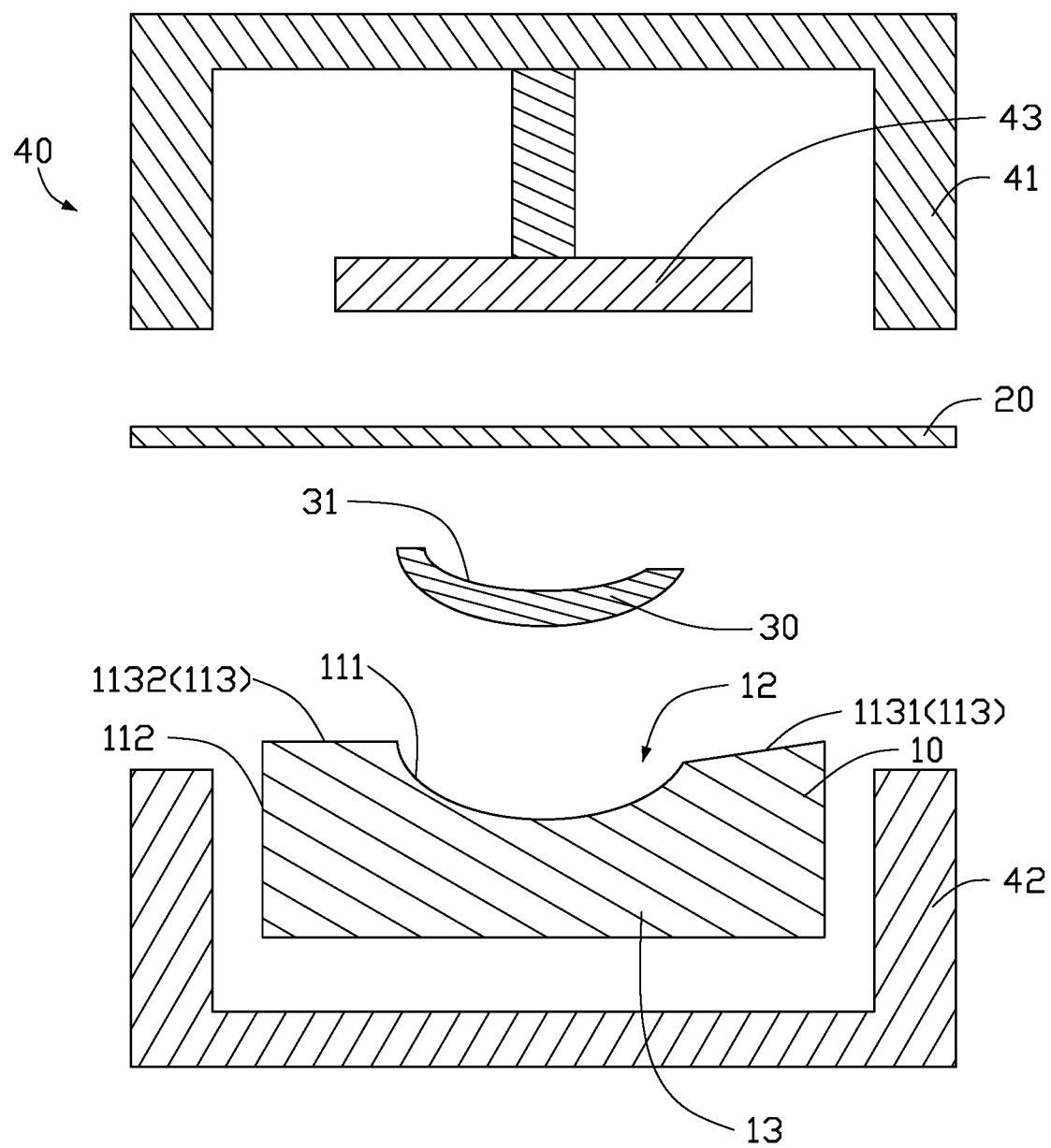
FIG. 4 is a schematic cross-sectional view of the fixture, the film, the workpiece and the hot press bonding device during step S1 of the bonding method as disclosed in FIG. 3.

As shown in FIG. 3, a method for bonding using the fixture 10 includes the following steps;

Step S1: As shown in FIG. 4, a hot press bonding device 40, a film 20, a workpiece 30, and a fixture 10 are provided. The hot press bonding device 40 includes a first chamber 41 and a second chamber 42. The first chamber 41 defines a first cavity, and the second chamber 42 defines a second cavity. The film 20 is to be bound to a surface 31 of the workpiece 30. A shape and a size of the receiving cavity 12 of the fixture 10 are correspondingly designed to match a shape and a size of the workpiece 30.

Referring to FIGS. 4 to 7, the end surface 113 of the fixture 10 is non-axisymmetric according to the bonding method as disclosed in the present disclosure.

In one embodiment, the film 20 may be a polymer film, a metal oxide film, a nanosol film, or the like.

In one embodiment, the surface 31 is curved in three-dimensions. The three-dimensional curved surface may be a concave three-dimensional curved surface, a convex three-dimensional curved surface, or an irregular three-dimensional curved surface.

Figure 5:
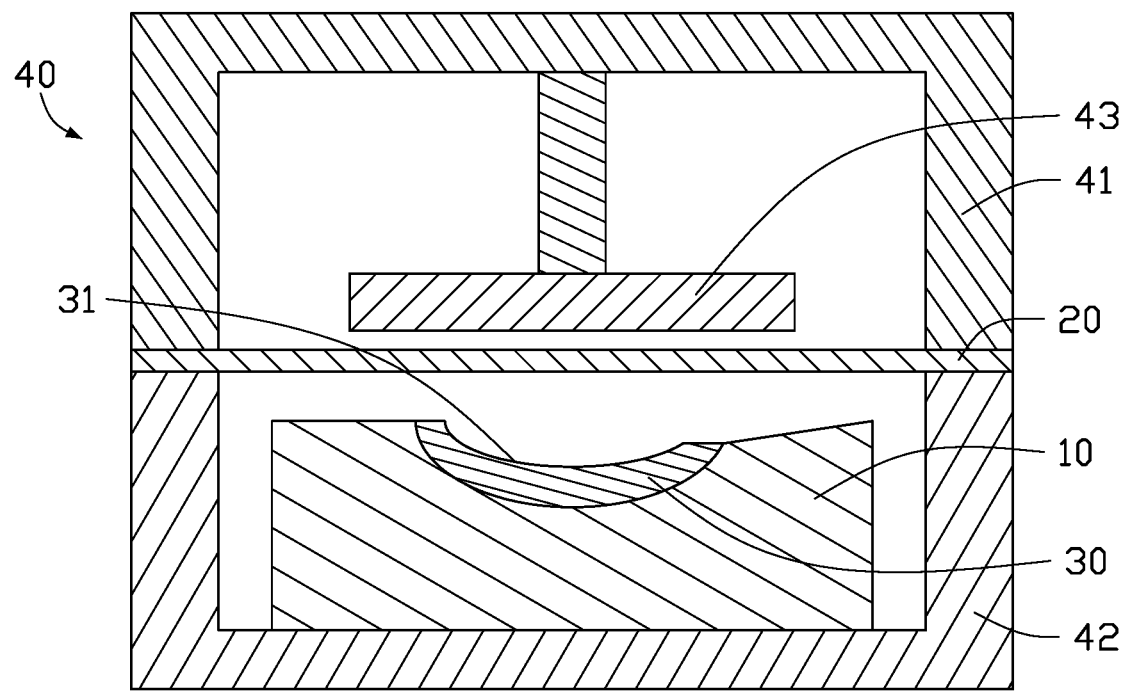
FIG. 5 is a schematic cross-sectional view of the fixture, the film, the workpiece and the hot press bonding device during step S2 of the bonding method as disclosed in FIG. 3.

Step S2: As shown in FIG. 5, the workpiece 30 is placed in the receiving cavity 12 from the open end 121, and the fixture 10 is placed in the second cavity defined by the second chamber 42. The surface 31 of the workpiece 30 faces the first chamber 41, then the first chamber 41 and the second chamber 42 are closed.

In step S2, the fixture 10 is placed in the second cavity defined by the second chamber 42, and after the first chamber 41 and the second chamber 42 are closed, a sealed working space is defined by the first and the second cavities 41, 42. The fixture 10 is placed directly below the film 20, and the surface 31 of the workpiece 30 faces the film 20, a subsequent hot press bonding process is performed in the work space.

Figure 6:
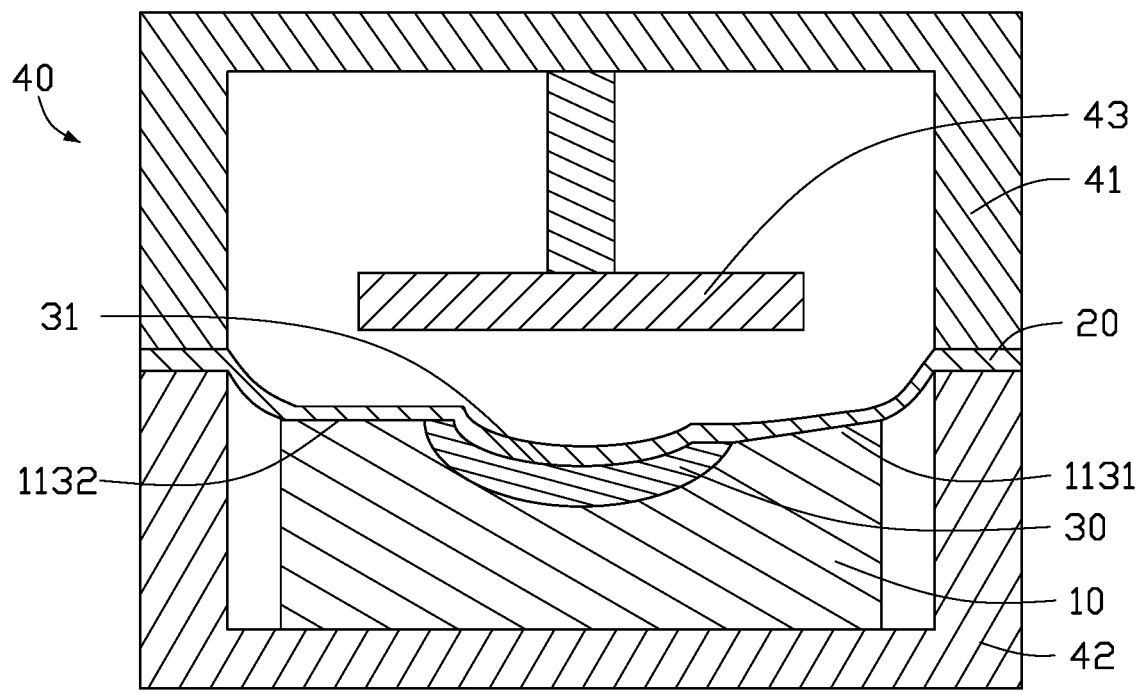
FIG. 6 is a schematic cross-sectional view of the fixture, the film, the workpiece and the hot press bonding device during step S3 of the bonding method as disclosed in FIG. 3.

Step S3: As shown in FIG. 6, a preset temperature and a preset pressure are applied to the film 20. The film 20 comes in contact with the protrusions 1132, followed by with the recesses 1131, and then the film 20 is bonded to the surface 31.

In an embodiment, step S3 may include the step of softening the film 20 by preheating the film 20 to the preset temperature.

In one embodiment, the first chamber 41 includes a heating member 43 which heats the film 20 to the preset temperature but does not affect the structural properties of the film 20, thereby facilitating subsequent operations.

In one embodiment, after the film 20 is softened, a negative pressure is applied to the second chamber 42 and a positive pressure is applied to the first chamber 41. A pressure on one side of the film 20 facing the first chamber 41 is greater than a pressure of another side of the film 20 facing the second chamber 42. Therefore, a differential pressure is created between opposite sides of the film 20. Under the differential pressure, the film 20 comes in contact with the protrusions 1132 near the surface of the second chamber 42, followed with the recess 1131, and the film 20 is attached and bonded to the surface 31.

Figure 7:
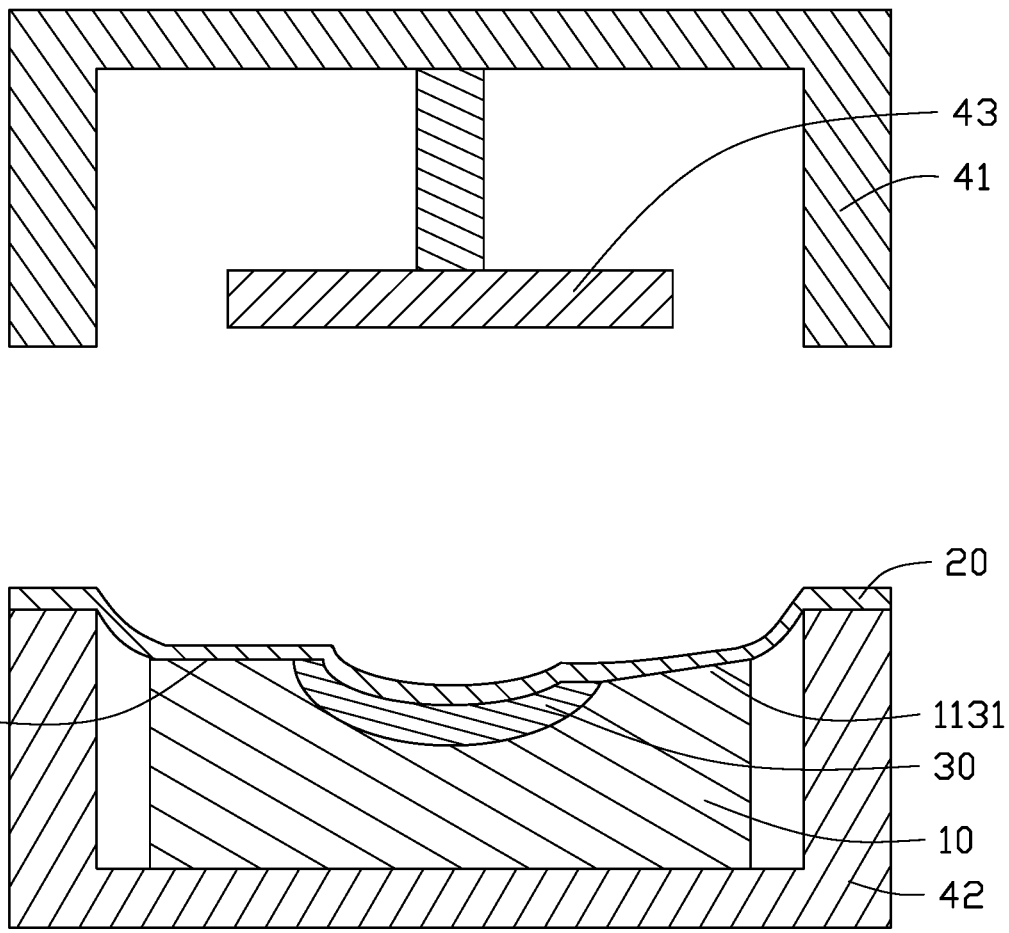
FIG. 7 is a schematic cross-sectional view of the fixture, the film, the workpiece and the hot press bonding device showing a first chamber of the fixture in an open state and a second chamber after step S3 of the bonding method as disclosed in FIG. 3.
Figure 8:
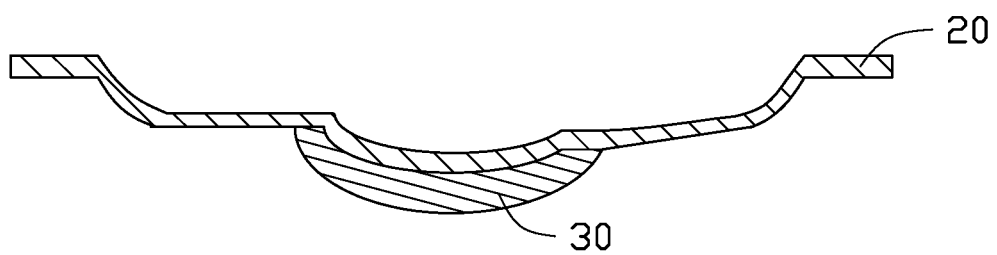
FIG. 8 is a schematic cross-sectional view showing an uncut film after bonding according to the bonding method as disclosed in FIG. 3.
Figure 9:
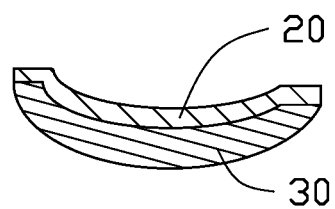
FIG. 9 is a schematic cross-sectional view showing the uncut film being cut after bonding according to the bonding method as disclosed in FIG. 3.

As shown in FIG. 7, after the film 20 is attached to the workpiece 30, the first chamber 41 and the second chamber 42 of the hot press bonding device 40 are opened. As shown in FIG. 8, the workpiece 30 with the film 20 attached thereon is taken out. In one embodiment, unnecessary and extra portion of the film 20 is trimmed from the workpiece 30 with the film 20 attached thereon by a cutting process. The unnecessary and extra portion of the film 20 is trimmed to the edges of the workpiece 30. FIG. 9 is a schematic cross-sectional view of a finished product wherein the workpiece 30 is bonded with the film 20 according to the method as disclosed in the present disclosure.

The end surface 113 of the cavity wall 11 of the fixture 10 includes recesses 1131 extending through a thickness of the cavity wall 11; and protrusions 1132 connecting the recesses 1131. When the film 20 and the workpiece 30 are bonded by the fixture 10, the film 20 first comes into contact with the protrusions 1132, and then with the recesses 1131, and then the film 20 is bonded to the surface 31 of the workpiece 30. During the hot press, air between the film 20 and the surface 31 can escape through the height difference between the recesses 1131 and the protrusions 1132, facilitating the film 20 being smoothly and completely attached to the surface 31 of the workpiece 30. Hence, wrapping of the film 20 near the center of the surface 31 after bonding maybe avoided.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A fixture for bonding, comprising:
    a base;
    a cavity wall fixed to the base;
    a receiving cavity defined by the cavity wall and the base;
    wherein the cavity wall comprises an inner surface, an outer surface opposite to the inner surface, and an end surface at an end away from the base, the end surface defines a plurality of protrusions and a plurality of recesses connecting the protrusions and being recessed towards the base, and each of the plurality of recesses penetrates the inner surface and the outer surface;
    each of the plurality of protrusions and each of the plurality of recesses are flat, each of the plurality of recesses is an inclined plane, and along a direction of the other surface toward the inner surface, a depth of each of the plurality of recesses recessed toward the base is gradually increased.

2. The fixture for bonding according to claim 1, further comprising a plurality of mounting holes extending through the base and the cavity wall.

* * * * *